United States Patent
Rath et al.

(10) Patent No.: US 11,579,794 B2
(45) Date of Patent: Feb. 14, 2023

(54) GARBAGE COLLECTION BASED ON CLOUD STORAGE CAPACITY

(71) Applicant: EMC IP Holding Company LLC, Hopkinton, MA (US)

(72) Inventors: Jagannathdas Rath, Bengaluru (IN); Kalyan C. Gunda, Bengaluru (IN); Ravi Kumar Vasarla, Bengaluru (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/148,421

(22) Filed: Jan. 13, 2021

(65) Prior Publication Data
US 2022/0222007 A1    Jul. 14, 2022

(51) Int. Cl.
*G06F 3/06*    (2006.01)
(52) U.S. Cl.
CPC .......... *G06F 3/0652* (2013.01); *G06F 3/0604* (2013.01); *G06F 3/067* (2013.01); *G06F 3/0631* (2013.01); *G06F 3/0653* (2013.01); *G06F 3/0659* (2013.01)
(58) Field of Classification Search
CPC .... G06F 3/0652; G06F 3/0604; G06F 3/0631; G06F 3/0653; G06F 3/0659; G06F 3/067
See application file for complete search history.

(56) References Cited

U.S. PATENT DOCUMENTS

| 10,346,297 | B1 * | 7/2019 | Wallace | G06F 3/0641 |
| 2016/0098229 | A1 * | 4/2016 | Schreiber | G06F 3/0673 |
| | | | | 711/166 |
| 2018/0276123 | A1 * | 9/2018 | Matsudaira | G06F 12/0246 |

OTHER PUBLICATIONS

Duggal, Abhinav, et al. "Data Domain Cloud Tier: Backup here, backup there, deduplicated everywhere!." 2019 USENIX Annual Technical Conference (USENIX ATC 19). 2019. (Year: 2019).*
Weiss, Zev, et al. "MjÖlnir: Collecting trash in a demanding new world." Proceedings of the 3rd Workshop on Interactions of NVM/FLASH with Operating Systems and Workloads. 2015. (Year: 2015).*

* cited by examiner

*Primary Examiner* — Nicholas J Simonetti
(74) *Attorney, Agent, or Firm* — Womble Bond Dickinson (US) LLP

(57) ABSTRACT

A storage capacity of a cloud storage system is determined. A recipe contains instructions for reclaiming storage of the cloud storage system. The storage capacity is insufficient to perform the entire recipe. In response, one or more data objects are deleted. A portion of the recipe is executed after the deletion. In some cases, local storage can be used for garbage collection when cloud storage is insufficient to perform even the portion of the recipe. Other embodiments are described and claimed.

20 Claims, 6 Drawing Sheets

GARBAGE COLLECTION BASED ON CLOUD STORAGE CAPACITY

TECHNICAL FIELD

Embodiments of the present disclosure generally relate to garbage collection of data objects stored on the cloud. In particular, embodiments of the disclosure relate to garbage collection of data objects stored on the cloud based on available storage capacity of the cloud storage system.

BACKGROUND

Data is an important asset for businesses today. Data can be stored on servers which can be cloud-based and/or reside in a local network. Backup for data can be stored in cloud based storage that is managed by a cloud provider. Cloud storage is useful for direct backup applications, as well as for deduplicated backup applications, to store data off-premises for long term retention.

Data deduplication is a process that eliminates duplicate copies of data and significantly decreases storage capacity requirements. In the deduplication process, unique chunks of data, or byte patterns, are identified and stored during a process of analysis. During analysis, other data chunks can be compared to the stored copy to determine whether there is a match. When a match occurs, the redundant chunk can be replaced with a reference that points to the stored chunk, thereby reducing duplicate data. Given that the same byte pattern may occur dozens, hundreds, or even thousands of times, the total amount of data that must be stored or transferred can be greatly reduced.

In a backup system with deduplication, a file can be split into segments and these segments are deduplicated across all files in the system. The segments are compressed and packed. In some instances, the packed segments can be encrypted in regions in containers. These containers can be described or represented as an object (e.g., a data object) in the cloud. The size of these objects can vary (e.g., 1 MB-16 MB, with an average segment size of 64 KB-128 KB) depending on how many segments each object contains.

Object storage (also known as object-based storage) is a computer data storage architecture that manages data as objects, as opposed to other storage architectures like file systems which manages data as a file hierarchy, and block storage which manages data as blocks within sectors and tracks. Each object typically includes the data itself, a variable amount of metadata, and a globally unique identifier. Object storage can be implemented at multiple levels, including the device level (object-storage device), the system level, and the interface level.

Some distributed file systems use an object-based architecture, where file metadata is stored in metadata servers and file data is stored in object storage servers. File system client software can interact with the metadata servers, and abstracts the metadata to present a full file system to users. The metadata can serve as a mapping between data on the file system and data stored in the chunks. For data management systems with out deduplication, the metadata mapping between the data objects and the file system can be one to one, whereas for data management systems with deduplication, the metadata mapping can be one to many because a single segment of data in an object can serve as backup for multiple files.

In some cases, with a log structured file system, writes can be made in chunks typically of the size equal to the segment sizes (e.g., 4 KB, 8 KB, 12 KB) such as by a backup application with deduplication. As data grows or changes, new segments are written to in-memory container objects and once an object is full, it is sealed and written to the storage/disk. Then, the next container object becomes active, and so on. Container objects are immutable in nature and are not modified in their lifetime. They are deleted under certain scenarios, for example, to reclaim memory.

With increased adaptation of cloud storage, backup applications (e.g., using deduplication) support movement of deduplicated objects to the cloud for long term retention (LTR). The deduplication ratio, object sizes, etc., may vary in the cloud tier. The data/objects are moved by the backup application based on various policies and configurations. For example, a policy may require that all data that is older than two weeks be moved to the cloud, with or without deduplication. Complete files can be moved as a single object or they are split and moved as multiple objects. This can vary based on system and application requirements.

BRIEF DESCRIPTION OF THE DRAWINGS

Embodiments of the disclosure are illustrated byway of example and not limitation in the figures of the accompanying drawings in which like references indicate similar elements.

DETAILED DESCRIPTION

Figure 1:
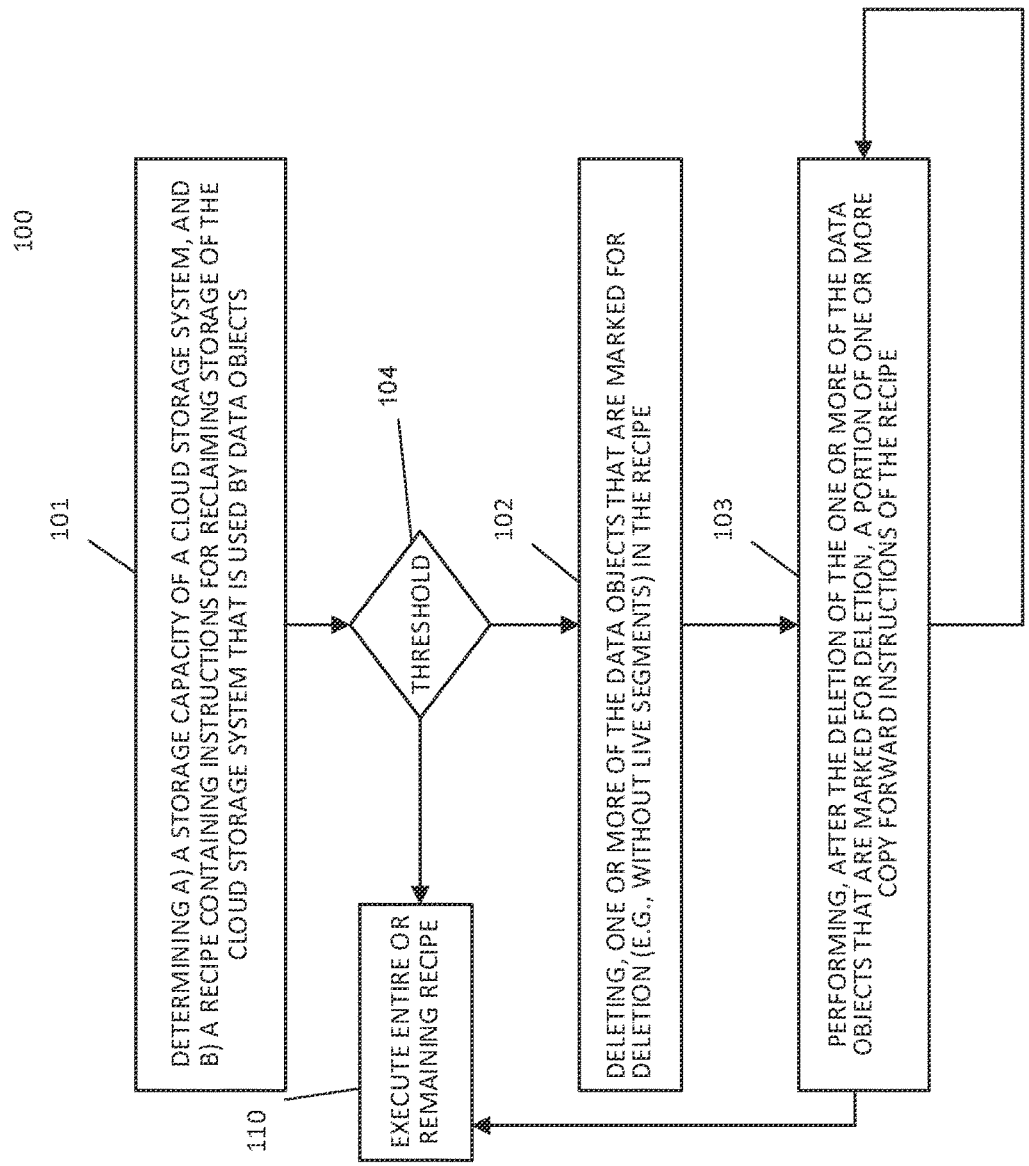
FIG. 1 shows a method for garbage collection of cloud stored objects, according to some embodiments.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "some embodiments," "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

A data management system (with or without deduplication) can manage backup of data in active/local tier memory. This local tier can be present in a shared facility with the data management system, and/or on a shared local network. With such a system, new files (generated by a host) are ingested and backed up (in data objects), continuously and over time. Files that exist on a host can be deleted and, as a result, one or more segments within different data objects may no longer be needed (as they are no longer referenced by any of the files on the host). These segments are known as dead segments. Accordingly, objects can become fragmented with a mix of live and dead segments. Some objects may contain only dead segments. These unused/dead segments can be cleaned up by garbage collectors (GC) using space reclamation techniques as described in other sections.

This issue of fragmentation of segments in objects extends to the cloud tier. In cloud operations, a cloud garbage collector (a garbage collector that performs cleanup on objects located on the cloud) uses similar algorithms to reclaim the space used by dead segments within fragmented cloud objects. A cloud GC can implement a mark-and-sweep space reclamation technique to reclaim the space from dead segments and unused objects on the cloud storage.

In such a process, a garbage collector can typically scan through metadata of the cloud objects. Local copies of the metadata can be kept for performance reasons, to minimize retrieval of cloud data which can be costly. The garbage collector can a) mark unused or dead objects as having no live segments, and b) objects that are partially filed or have mix of live and dead segments (fragmented objects). The garbage collector can then merge the live segments from the fragmented objects and write them into new container objects—copying the live segments only. The garbage collector can then mark the fragmented objects as well as the dead objects as "to-be-deleted".

Such a space reclamation process can be done in local tier memory/storage, or on the cloud. Under the local tier approach, partial filled data objects are read from the cloud storage tier to local tier/system. Live segments are merged into a new local data container object. Newly created data object are written from local system to cloud storage. On completion of the write operation, a delete request of partial filled objects as well unused objects is sent to the cloud for deletion. This approach is costly as it involves a great deal of cloud I/O and transactions—thus requiring a substantial amount of time to complete.

In a cloud-based approach a garbage collector prepares the recipe which has all the necessary information such as metadata and mapping information for objects to be newly created, copy forward instructions (e.g., which segments of which objects will be copied forward to which new object), and which objects are to be deleted. The recipe can be sent from the garbage collector to a cloud provider that manages storage of the data objects on the cloud.

Cloud providers can have API and services that execute the recipe on behalf of the local system. The instructions of the recipe (e.g., the copy-forwards, new object creations, deletions, etc.) are done in the cloud, e.g., executed by the cloud provider. Such an approach minimizes the number of cloud transactions from the local system (e.g., a data manager that backs up data with deduplication) thereby reducing the overall cost of the operation. A cloud provider can execute the recipe directly, or via lambda functions (or other equivalent compute service technology) that are accessible to the local system in the case of public cloud providers.

When the cloud storage is completely full or is near full, however, recipe execution in the cloud can fail because there is insufficient space to perform the copy forwards and new object creations. Executing the full recipe (determined from scanning the metadata) would require additional cloud storage space to be made available. Until this lack of capacity is sorted out, additional garbage collector action would not be effective because the system lacks the storage/memory resources to free up more storage/memory.

Such a situation can worsen over time. The local data manager may wish to store new data to the cloud (e.g., due to the creation or modification of a file at a host machine) and the new data would fail to be stored due to shortage of space. New objects that house the new data could accumulate in local tiers without migrating to the cloud, until the garbage collector can reclaim space or additional storage capacity is added on the cloud.

For private cloud storage, it is not always feasible for a customer to increase the storage capacity (e.g., adding more shelves or disks) whenever such a situation arises. Public cloud providers have different enforceable limits that put a cap on cost to the customer, such as quotas/restrictions on maximum storage capacity. As such, due to the lack of available storage, the garbage collector can become blocked. Customers may be required to purchase additional storage capacity from the providers to resume operations, which would be costly in terms of money as well as time. As such, the issue of cloud-based garbage collection with limited storage capacity should be addressed to reduce the risk of the garbage collector being blocked and reduce cost to the customer.

FIG. 1 shows a method for garbage collection of cloud stored objects, according to some embodiments. The method can address problems described, such as reclaiming resources on the cloud when the cloud storage is operating at a limited capacity. At operation 101, the method includes determining a) a storage capacity of a cloud storage system, and b) a recipe containing instructions for reclaiming storage of the cloud storage system that is used by data objects.

Storage capacity is the amount of storage (e.g., disk space) that is available by the cloud storage system and not occupied by the objects or other data. A cloud storage system can include disk drives, hardware and software that work together to provide fast and reliable storage for computing and data processing. A cloud storage system provides storage capacity and data protection features.

The garbage collector can start with querying the cloud storage system for the available storage capacity (free disk space), such as, for example, whether the storage capacity of the cloud storage system is completely filled, how much space is currently free, what the current used space is, and/or what the total storage capacity is. The garbage collector can scan the metadata of the objects and mark which objects have only dead segments, as well as those that are fragmented (having a mix of live and dead segments).

The metadata of the cloud objects can be maintained locally as well as on the cloud. If it is available locally, the garbage collector can scan the local metadata. Otherwise, the garbage collector can retrieve it from the cloud.

The metadata can be scanned to determine how much additional cloud storage space (i.e. memory) is needed for the new objects to be created. If the storage capacity of the cloud storage system satisfies a threshold (e.g., the storage capacity is less than the amount needed to create all the new objects and copy segments to those new objects), then the method can proceed to operation 102. Otherwise, if the storage capacity of the cloud storage system is sufficient, the entire recipe can be executed at operation 110, as is the case under normal operation. For example, the data manager can send the entire recipe to the cloud provider to execute.

At operation 102, the method includes deleting, one or more of the data objects that are marked for deletion in the recipe. For example, based on the scan of the metadata, the garbage collector marked some data objects as having only dead segments. Those objects do not require copy-forward instructions. The garbage collector can create a sub-recipe that is a portion of the entire recipe, having only the deletion instructions for all such object IDs with all dead segments. This recipe (the portion) can be sent to the cloud provider for execution. The garbage collector can wait until the deletion is completed. In such a manner, space is freed in the cloud, without requiring performance of copy forwards or new object creations. The new available storage capacity can be noted by the garbage collector, to determine the next portion of the recipe to execute.

At operation 103, the method includes performing, after the deletion of the one or more of the data objects that are marked for deletion, a portion of one or more copy forward instructions of the recipe. The portion can be determined based on the available space (storage capacity) of the cloud storage system after the deletion of the data objects that are marked for deletion. If the cloud does not have sufficient space after the deletions to execute the entire recipe, then a portion of the recipe (e.g., including object id info, copy forward mappings, etc.) is determined that can be executed with the current available storage. This portion or sub-recipe is then executed (e.g., sent as a recipe to the cloud provider).

The amount of space available, relative to the amount of space needed to perform the copy forwarding and creation of new objects, may require repetition of operation 103. In other words, the method may repeatedly determine portions of the recipe to perform, one after the other, in succession. Further, as the operation is repeated, each portion can be larger (e.g., requiring more storage and/or freeing up more storage) than the last. In other words, each portion of the recipe can contain instructions for an increasing number of objects that are copied forward, and/or an increasing number of resulting new objects, because the storage capacity of the cloud storage increases with execution of each portion.

For example, a first iteration of operation 103 can specify 1000 objects to be processed for copy forward instructions. The next iteration may contain 1200 objects. The next iteration may contain 1400, and so on. Each portion of the recipe can be executed by producing and communicating a complete recipe (a sub-recipe) to the cloud provider. Each sub-recipe can specify the number of objects that are to be copied-forward. The portion (sub-recipe) can be proportional to the available cloud storage space. When each sub-recipe completes execution, some amount of cloud storage space is freed up (due to deletion of the fragmented objects after their live segments are copy forwarded to new objects), thereby allowing for a larger number of objects to be processed in a subsequent iteration.

It is possible in some cases, that the deletion of operation 102 frees up enough space, such that the entire remaining recipe can be performed after deleting objects with only dead segments, without requiring dividing the remaining recipe into sub-recipes.

In addition, in some embodiments, when it is determined that the storage capacity is sufficient, a remaining portion of the recipe is performed by in a final operation. For example, after performing the eighth portion of the recipe, there may be sufficient space to perform the rest of the recipe. In such a case, the GC may send the remaining part of the recipe to the cloud to be performed in a final operation, rather than continue to divide up the recipe. It should be understood that the GC can run periodically (e.g., weekly, monthly, etc.), thus a final operation would mean that the clean-up is complete for the current GC run, but the GC would run again according to schedule.

Some cloud providers support accepting and executing recipes directly. Some cloud providers support cloud compute services such as lambda functions (provided by AWS) or other equivalent technology.

Further, in some cases, there may be no objects marked for deletion, thus the method can skip operation 102 and proceed to operation 103 to perform the copy forward instructions in portions, to free up memory, so long as there is sufficient space to perform a single copy forward instruction and/or create a single new data object.

In some cases, however, there may be a) no objects that can be deleted readily (such as those containing only dead segments), and b) insufficient storage capacity to perform even a single copy forward. In this case, local storage tier may be utilized to perform some of the GC operations until there is sufficient storage in the cloud to perform at least a portion of the recipe. Such a case is shown in FIG. 2.

Figure 2:
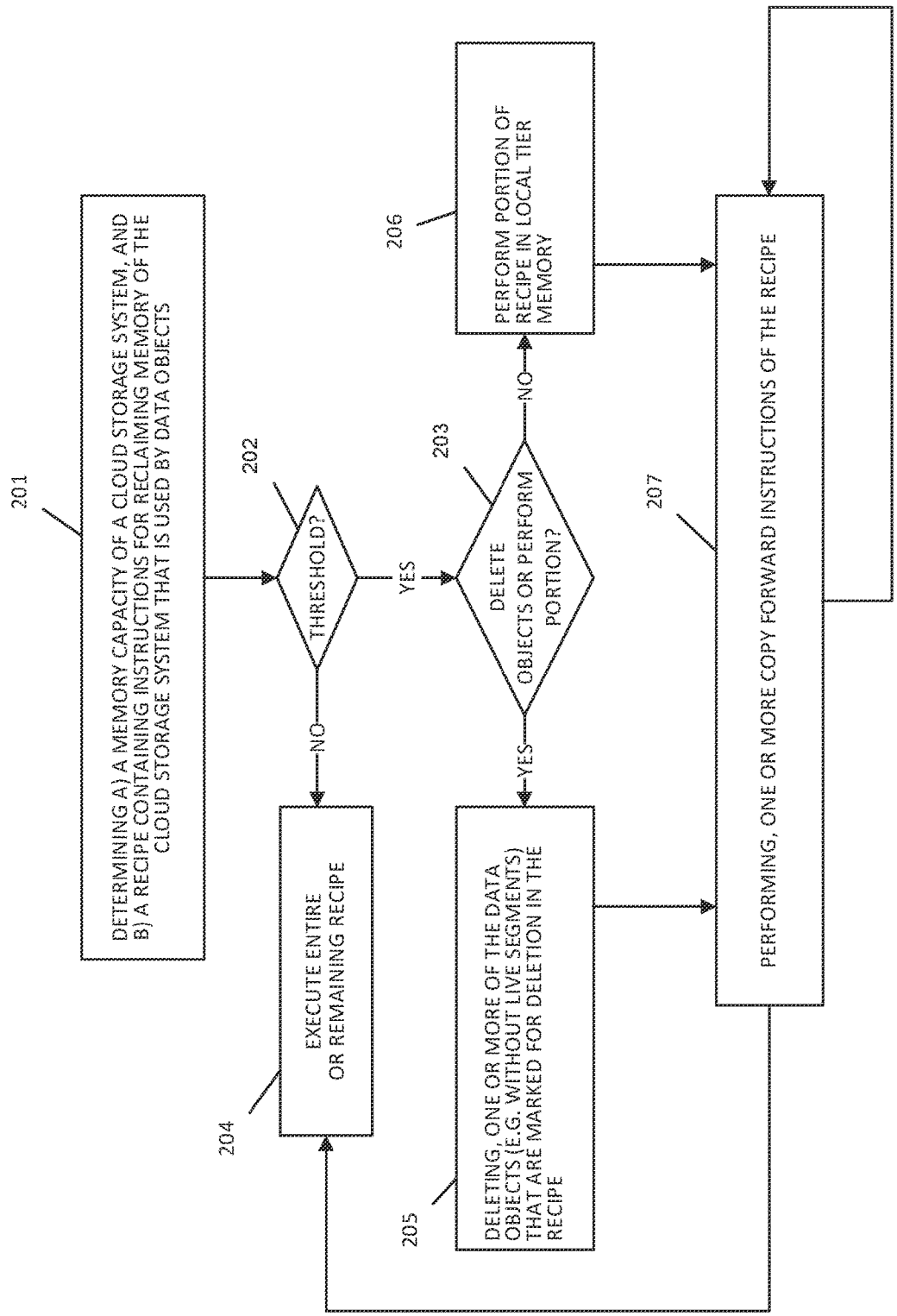
FIG. 2 shows a method for garbage collection of cloud stored objects with local tier memory, according to some embodiments.

In FIG. 2, a method is shown for garbage collection of cloud stored objects using local tier memory. As discussed with respect to FIG. 1, at block 201, the method includes determining a) a storage capacity of a cloud storage system, and b) a recipe containing instructions for reclaiming storage of the cloud storage system that is used by data objects.

At block 202, if there a threshold is satisfied (e.g., there is insufficient storage to perform the entire recipe) then method proceeds to block 203. Otherwise, the method proceeds to block 204 and the entire recipe is performed on the cloud. This is the normal operation scenario. The threshold of FIG. 1 and FIG. 2 can be based on a difference between the storage capacity of the cloud storage system and a number of new data objects that would be created as a result of the one or more copy forward instructions of the recipe. For example, if the current storage capacity of the cloud storage system is X, but the number of new data objects require X+5 kilobytes, then the current storage is insufficient to generate the new data objects.

At block 203, in response to a) none of the data objects being marked for deletion in the recipe (e.g., because none of the objects were identified as having no live segments/ only dead segments), and b) the storage capacity being insufficient for a single one of the one or more copy forward instructions in the recipe, then the method proceeds to block 206. Otherwise, the method will proceed to operations 205 and 207, where the data objects that are marked for deletion will first be deleted, then the copy forward instructions are performed (as described with respect operations 102 and 103 in FIG. 1).

At operation 206, a portion of the recipe is performed using local tier memory/storage. Local tier memory/storage can be memory/storage that resides on-premise, for example, in a local network. One or more of the data objects that are marked for copy forward instructions are downloaded to local memory from the cloud, resulting in one or more local data objects. The portion of the one or more copy forward instructions that are relevant to those data objects is performed using the local data objects, to create new data objects, also residing in local memory/storage.

A recipe instructing deletion of those data objects can be communicated to cloud storage to delete those downloaded data objects from the cloud storage. The new data objects are then uploaded to the cloud storage system to replace those data objects that were downloaded and deleted. The number of data objects to be downloaded can be determined based on routine test and experimentation and can be preconfigured (e.g., 500, 1000, or 2000 data objects) as a setting. This can vary based on application.

In some embodiments, operation 206 is repeated for more than one iteration, to free up a sufficient amount of space so that a sizeable portion of the recipe can be executed in the next operation. The number of data objects to be downloaded locally, and the number of iterations, can be determined based on routine test and experimentation. These variables can be configurable as settings (e.g., 500, 1000, or 2000 data objects at 1, 2, or 5 iterations), and can vary from one application to another based on factors such as, but not limited to, cloud egress costs, network or processing latency, number of total new objects to be created, and the fragmentation level of the objects. In some embodiments, the number of iterations is minimized or optimized to a minimal number to stop as soon as there is sufficient space for a portion of the recipe to be executed. Downloading objects can involve costs for public clouds, and uploads add to the total time the operation.

After completion of the operation, storage is freed up on the cloud storage system to allow for at least a portion of the copy forwards to be performed by the GC. This is because the new data objects occupy less space than the previously downloaded data objects because they contain only the live segments that are merged (merged from the downloaded data objects)—the dead segments are discarded.

After the storage is freed up in operation 206, the method can proceed to operation 207 where a portion of the one or more copy forward instructions of the recipe is executed (e.g., by communicating a recipe with that portion of instructions to the cloud provider). As described, this portion (e.g., the number of objects that are to be copy forwarded) can be determined based on the current storage capacity of the cloud storage system. Operation 207 can be repeated with increasing portion sizes (as described in relation to operation 103 in FIG. 1). Similarly, when space is sufficient, the entire recipe can be executed.

Figure 3:
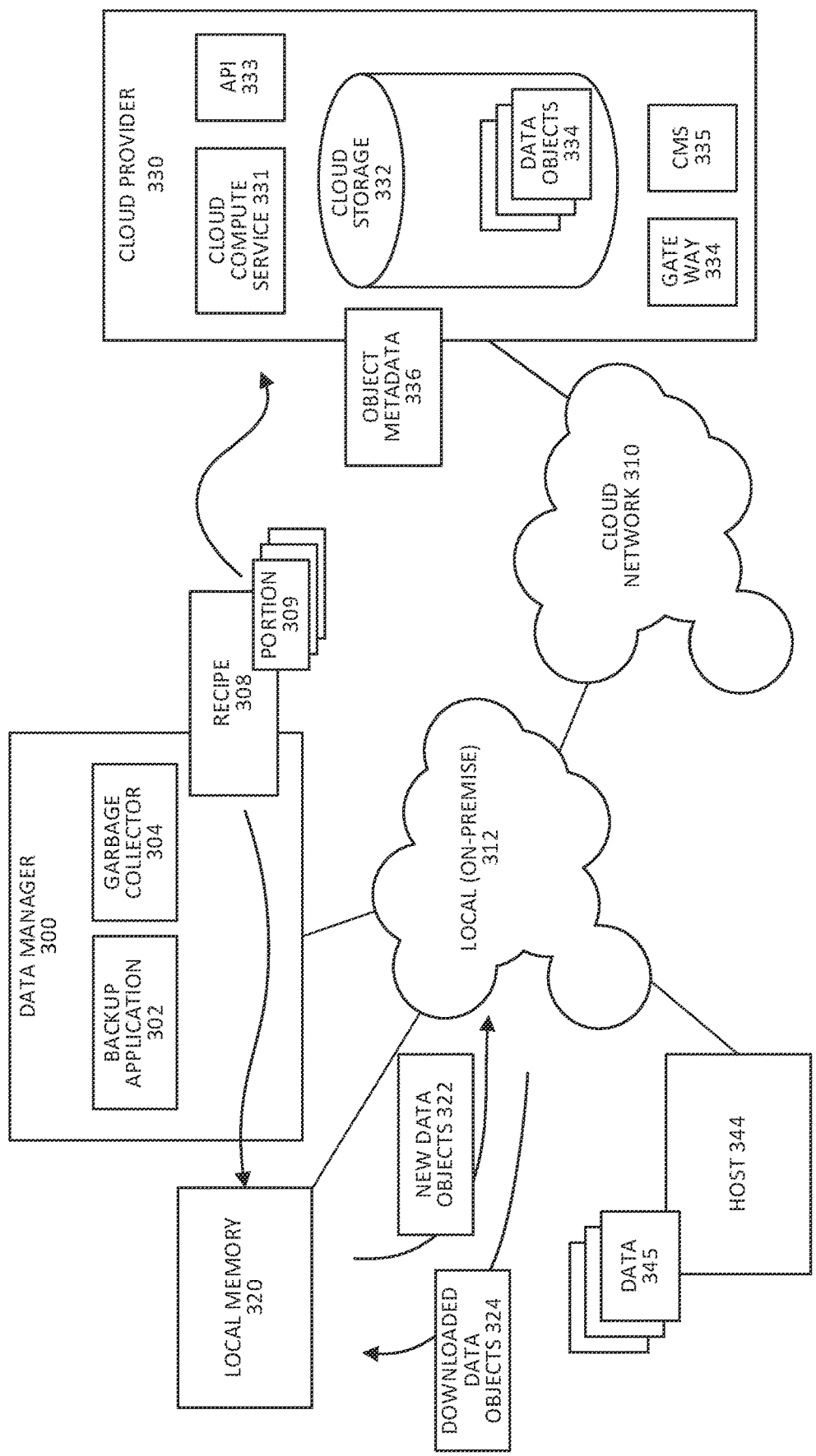
FIG. 3 shows an example of garbage collection for objects that are stored on the cloud, according to some embodiments.

FIG. 3 shows an example of garbage collection for objects that are stored on the cloud, according to some embodiments. A data manager 300 manages backup of data 345 that is produced and/or used by host 344. The data can be backed up in objects stored in cloud-based storage. These objects, also referred to as containers, data objects, or cloud objects, store data that customers rely upon for safe storage in an object-based cloud storage architecture. For example, the host 344 may support one or more virtual machines that each have associated files, software, and settings that are stored in data 345. This data can be organized in one or more file system architectures.

The data manager 300 can include a backup application 302 that includes algorithms and logic, such as those used by the garbage collector to perform operations described herein. The data manager and the backup application can back up the data 345 by storing the data in data objects 334 which is stored in cloud storage 332.

Cloud storage is a model of computer data storage in which the digital data is stored in logical pools, said to be on "the cloud". The physical storage can span multiple servers which are not necessarily co-located. The cloud storage provider 330 maintains the cloud storage and is responsible for making the data available and accessible to customers (e.g., connected to the local network 312 through a cloud network 310. The cloud storage provider may include interfacing components such as, for example, a cloud computing service 331, an application programming interface (API), or applications that utilize the API, such as a cloud storage gateway 334 or Web-based content management systems (CMS) 335, any of which can be used by the data manager 300 and/or garbage collector 304 to perform the operations described.

As described, object metadata 336 can serve as a mapping between data 345 on the file system (e.g., host 344) and data stored in the data objects 334. For data management systems without deduplication, the metadata mapping between the data objects and the file system can be direct one to one, whereas for data management systems with deduplication, the metadata mapping can be one to many, because a single segment of data in an object can serve as backup for multiple files. Also, these mappings might also simply contain the mapping of dedupe segments to the container object where they are present on.

The garbage collector can scan the object metadata to determine objects that are ready to be deleted (having no live segments), objects that are fragmented (having one or more live segments and one or more dead segments), and objects that have only live segments. The object metadata can be made available by the cloud provider 330. In some cases, the data manager 300 maintains and updates a copy of the object metadata locally, to reduce overhead when performing garbage collection.

Based on the scanning of the metadata, the garbage collector 304 can draft a recipe 308 that can include all the objects that are to be deleted (having no live segments), the number of new objects to be created for copy forward operations, the segments of fragmented objects that are to copied forward into the new objects, and instructions to delete the fragmented objects after performing the copy forwards. The garbage collector can get the available storage space of the cloud storage system from the cloud provider (e.g., through one or more requests to any of components 331, 333, 334, or 335).

The garbage collector can determine if the available storage space of the cloud storage system is sufficient to perform the entire recipe 308. If not, the methods described in other sections are performed to divide the recipe into portions 309. These portions can then be executed by the cloud provider (e.g., through passing the portions to components 331, 333, 334, or 335) one after the other. The garbage collector can be scheduled to run at regular periods, for example, once a week, once a month, etc. The garbage collector can be configured by a user with admin credentials.

As described, in some cases there may be no available space to perform even a single copy forward instruction, and no objects that can be deleted readily (because none contain only dead segments), which could potentially lock up the garbage collector and backup of data. Thus, one or more fragmented data objects 324 can be downloaded to local memory 320. A portion of copy forward instructions can be performed on those downloaded data objects to generate new data objects 322 that contain the merged live segments from the downloaded data objects. The downloaded data objects are then deleted on cloud storage 332, and the new data objects are added. As such, locking of the garbage collector and backups can be prevented.

Figure 4:
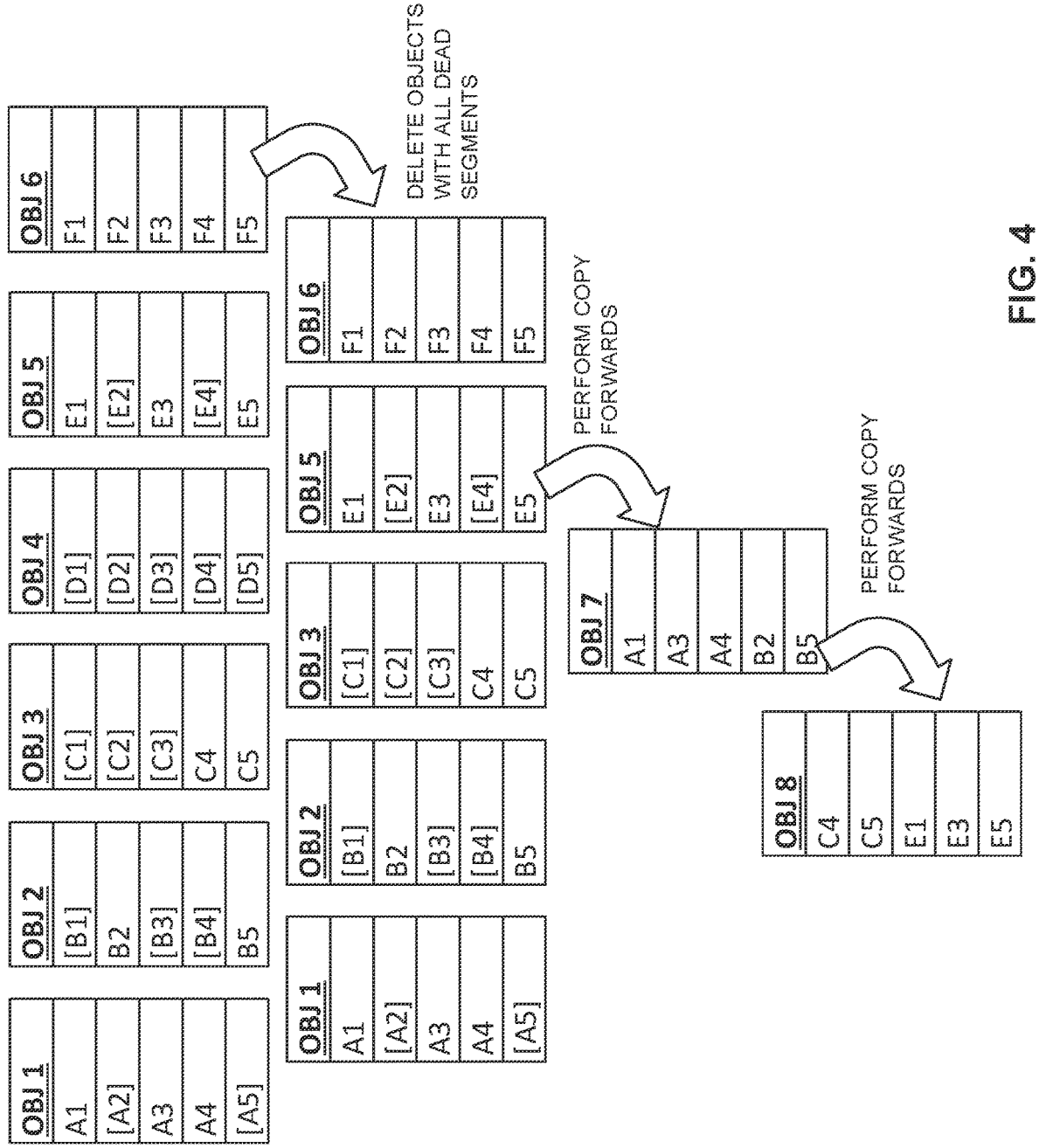
FIG. 4 shows an example of object-recipe execution, according to some embodiments.

FIG. 4 shows an example of object-recipe execution according to some embodiments. Objects 1-6 occupy space in cloud storage. Each object includes respective segments (e.g., A1-A5, B1-B5, etc.). Each segment is live unless shown with brackets. For example, 'A1' is live but '[A2]' is a dead segment. The garbage collector can determine which segments are live and dead by referring to the metadata for each object. The metadata maps the segments to files that are backed up, and if no files reference the relevant segment, then that segment can be marked as dead. In reality, a storage system has more than six objects, and each object typically contains many more than five segments, however, for illustration purposes, this example assumes that six objects occupy space in cloud storage.

After scanning the metadata, and reviewing the available storage space of the storage system, the garbage collector determines that the storage system has insufficient space to perform the entire recipe of copy forwards, which, in this example, includes creating two new objects.

The garbage collector can first perform deletion of all objects that contain only dead objects, such as object 4. After this deletion, space is freed up. The garbage collector can then perform a portion of the recipe on the cloud, by sending a portion of the recipe to the cloud provider. This portion instructs to merge live segments of object 1 and object 2 into a new object 7. The portion also instructs to delete object 1 and 2 after the merge.

Next, the garbage collector sends another portion of the recipe to the cloud provider, to merge live segments of object 3 and object 5 to a new object 8. This portion also instructs to delete object 3 and object 5 after the merge. In this manner, the garbage collector is able to reclaim memory/storage, even though the initial available space of the cloud storage was insufficient to execute the full recipe.

Figure 5:
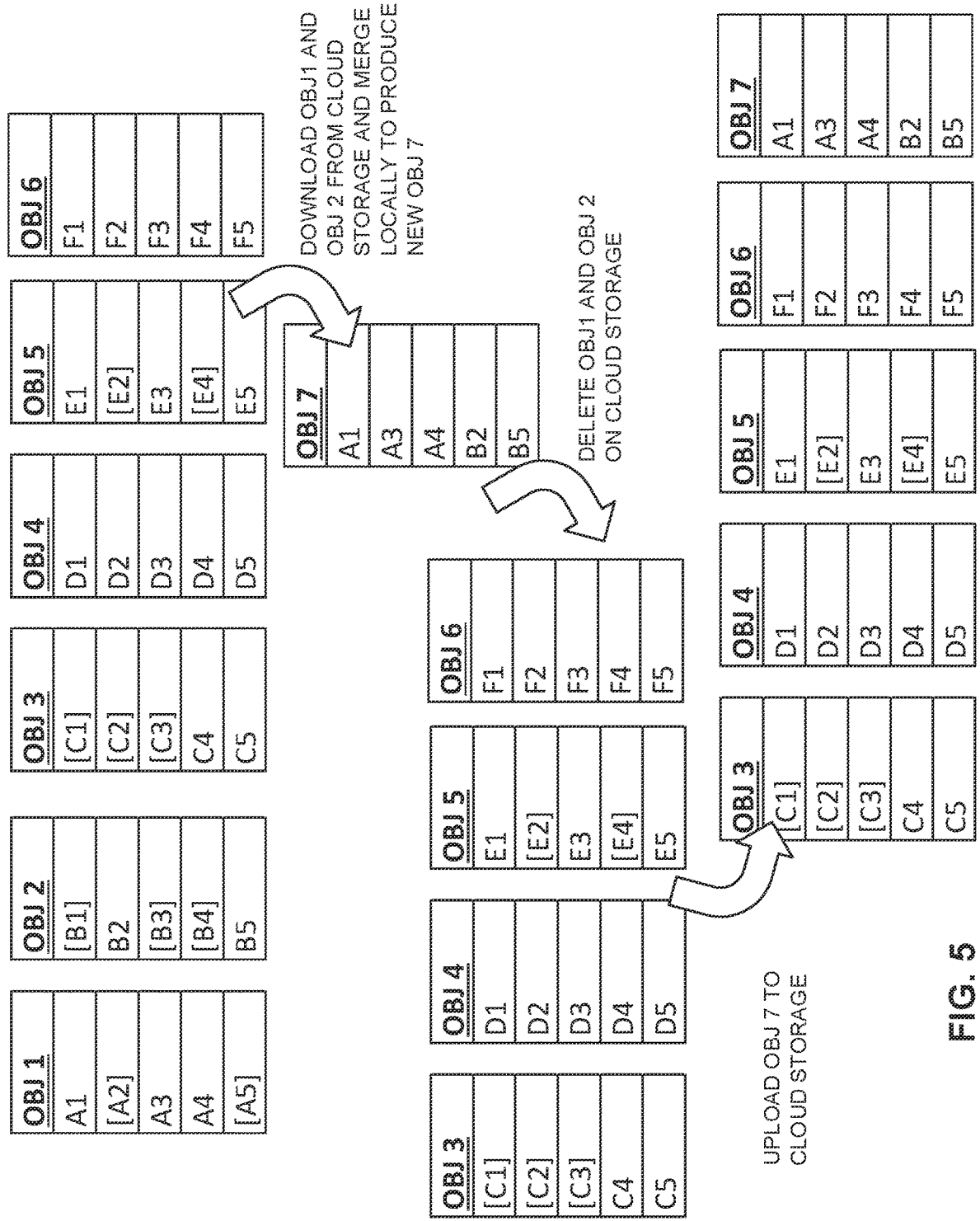
FIG. 5 shows an example of object-recipe execution with local memory, according to some embodiments.

FIG. 5 shows another example of object-recipe execution. In this case, the metadata reveals to the garbage collector that there are no objects that can be readily deleted (having only dead segments) and the storage system has insufficient space (e.g., no available space) for even a single copy forward operation. As described with respect to FIG. 2, the objects can be downloaded to local tier memory for merging.

For example, the garbage collector can download objects 1 and 2 and merge them in local tier memory to create new object 7, also in local memory. The garbage collector can then instruct the deletion of object 1 and object 2 in cloud storage to free up space. New object 7 can be uploaded to the cloud. If necessary, the garbage collector can then determine another portion of the recipe to execute, either locally (through repeating the download, merge, and upload steps with other objects) or on the cloud (as described with respect to FIG. 4 and other sections).

It should be understood that the examples shown in FIG. 4 and FIG. 5 are simplified for illustration purposes and that, in reality, a greater number of objects, segments, and operations can be performed to free up space in a cloud storage system.

Figure 6:
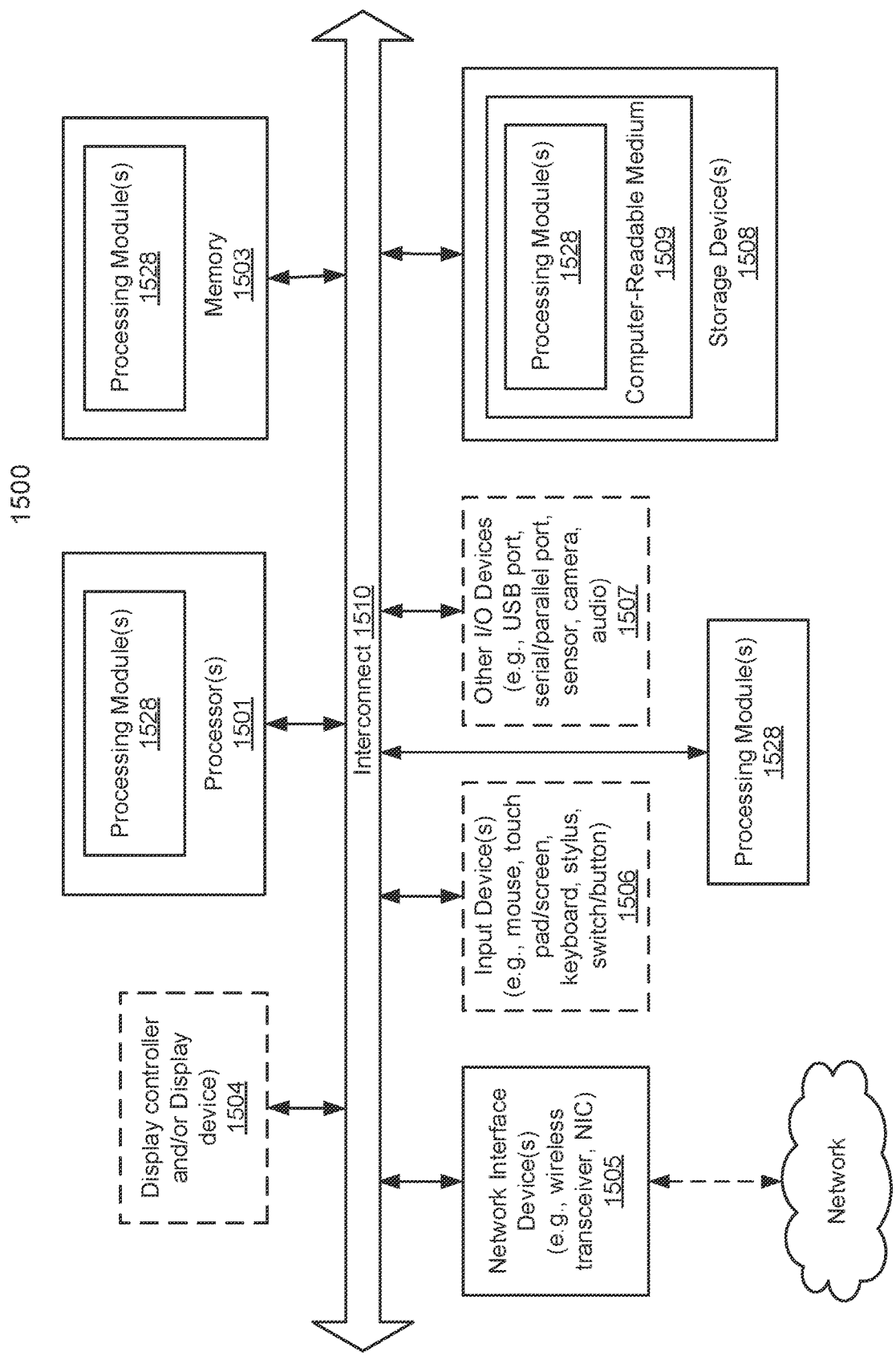
FIG. 6 shows an example data processing system, according to some embodiments.

FIG. 6 shows an example data processing system, according to some embodiments. This example data processing system, which can be described as a computing system, may be used in conjunction with one or more embodiments of the disclosure, such as for performing the method described in FIG. 1 and FIG. 2 and/or as a data manager, cloud provider, host, or cloud storage system.

For example, system 1500 may represent any of data processing systems described above performing any of the processes or methods described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS)transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein. In addition, the computer-readable storage medium 1509 may also include removable or portable media (e.g. magnetic disk storage media, optical storage media, USB media, CD-ROM, flash memory devices, etc.).

Processing modules 1528 (or component/unit/logic) may represent any of the components of the data manager, host, cloud provider, etc., such as, for example, backup application 302. Processing modules 1528 may also reside, completely or at least partially, within memory 1503 and/or within processor 1501 during execution thereof by system 1500, memory 1503, and processor 1501, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

The term "approximately" or "substantially" may be used herein and may be interpreted as "as nearly as practicable," "within technical limitations," and the like. In addition, the use of the term "or" indicates an inclusive "or" (e.g. "and/or") unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   determining a) a storage capacity of a cloud storage system, and b) a recipe containing instructions for reclaiming storage of the cloud storage system that is used by data objects;
   in response to the storage capacity satisfying a threshold, deleting, one or more of the data objects that are marked for deletion in the recipe; and
   performing, after the deletion of the one or more of the data objects that are marked for deletion, a portion of one or more copy forward instructions of the recipe, the portion determined based on the storage capacity of the cloud storage system after the deletion of the data objects that are marked for deletion; and
   in response to a) none of the data objects being marked for deletion in the recipe, and b) the storage capacity being insufficient for a single one of the one or more copy forward instructions, uploading new data objects containing live segments of the one or more data objects to the cloud storage system to replace the one or more of the data objects of the cloud storage system.

2. The method of claim 1, further comprising performing one or more additional portions of the one or more copy forward instructions of the recipe, in successive operations.

3. The method of claim 2, wherein each of the one or more additional portions of the one or more copy forward instructions require an increasing amount of storage capacity for the cloud storage system to perform.

4. The method of claim 2, wherein, when it is determined that the storage capacity is sufficient, a remaining portion of the recipe is performed by in a final operation.

5. The method of claim 1 wherein generating the new data objects includes
   downloading one or more of the data objects in a local storage, resulting in one or more local data objects with the live segments; and
   performing the portion of the one or more copy forward instructions on the one or more local data objects to copy forward the live segments from the one or more local data objects to new data objects.

6. The method of claim 5, further comprising, performing additional one or more portions of the one or more copy forward instructions of the recipe, after replacing the one or more of the data objects of the cloud storage system that were downloaded with the new data objects.

7. The method of claim 1, wherein the method is performed by a garbage collector that is integrated in a data processing system that is separate from the cloud storage system.

8. The method of claim 1, wherein the threshold is based on a difference between the storage capacity of the cloud storage system and a number of new data objects that would be created as a result of the one or more copy forward instructions of the recipe.

9. A non-transitory computer-readable medium storing instructions which, when executed by one or more processors of a networked computing device, cause the computing device to perform operations comprising:
   determining a) a storage capacity of a cloud storage system, and b) a recipe containing instructions for reclaiming storage of the cloud storage system that is used by data objects;
   in response to the storage capacity satisfying a threshold, deleting, one or more of the data objects that are marked for deletion in the recipe; and
   performing, after the deletion of the one or more of the data objects that are marked for deletion, a portion of one or more copy forward instructions of the recipe, the portion determined based on the storage capacity of the cloud storage system after the deletion of the data objects that are marked for deletion; and
   in response to a) none of the data objects being marked for deletion in the recipe, and b) the storage capacity being insufficient for a single one of the one or more copy forward instructions, uploading new data objects containing live segments of the one or more data objects to the cloud storage system to replace the one or more of the data objects of the cloud storage system.

10. The non-transitory computer-readable medium of claim 9, further comprising performing one or more additional portions of the one or more copy forward instructions of the recipe, in successive operations.

11. The non-transitory computer-readable medium of claim 10, wherein each of the one or more additional portions of the one or more copy forward instructions require an increasing amount of storage capacity for the cloud storage system to perform.

12. The non-transitory computer-readable medium of claim 10, wherein, when it is determined that the storage capacity is sufficient, a remaining portion of the recipe is performed by in a final operation.

13. The non-transitory computer-readable medium of claim 9 wherein generating the new data objects includes
  downloading one or more of the data objects in a local storage, resulting in one or more local data objects with the live segments; and
  performing the portion of the one or more copy forward instructions on the one or more local data objects to copy forward the live segments from the one or more local data objects to new data objects.

14. The non-transitory computer-readable medium of claim 13, further comprising, performing additional one or more portions of the one or more copy forward instructions of the recipe, after replacing the one or more of the data objects of the cloud storage system that were downloaded with the new data objects.

15. A data processing system, comprising:
  computer-readable memory; and
  a processor that executes instructions stored on the computer-readable memory, causing the data processing system to perform operations including:
  determining a) a storage capacity of a cloud storage system, and b) a recipe containing instructions for reclaiming storage of the cloud storage system that is used by data objects;
  in response to the storage capacity satisfying a threshold, deleting, one or more of the data objects that are marked for deletion in the recipe; and
  performing, after the deletion of the one or more of the data objects that are marked for deletion, a portion of one or more copy forward instructions of the recipe, the portion determined based on the storage capacity of the cloud storage system after the deletion of the data objects that are marked for deletion; and
  in response to a) none of the data objects being marked for deletion in the recipe, and b) the storage capacity being insufficient for a single one of the one or more copy forward instructions, uploading new data objects containing live segments of the one or more data objects to the cloud storage system to replace the one or more of the data objects of the cloud storage system.

16. The data processing system of claim 15, further comprising performing one or more additional portions of the one or more copy forward instructions of the recipe, in successive operations.

17. The data processing system of claim 16, wherein each of the one or more additional portions of the one or more copy forward instructions require an increasing amount of storage capacity for the cloud storage system to perform.

18. The data processing system of claim 16, wherein, when it is determined that the storage capacity is sufficient, a remaining portion of the recipe is performed by in a final operation.

19. The data processing system of claim 15, wherein generating the new data objects includes
  downloading one or more of the data objects in a local storage, resulting in one or more local data objects with the live segments; and
  performing the portion of the one or more copy forward instructions on the one or more local data objects to copy forward the live segments from the one or more local data objects to new data objects.

20. The data processing system of claim 19, further comprising, performing additional one or more portions of the one or more copy forward instructions of the recipe, after replacing the one or more of the data objects of the cloud storage system that were downloaded with the new data objects.

* * * * *